United States Patent [19]

Abe

[11] 4,158,195
[45] Jun. 12, 1979

[54] PULSE TRANSMISSION-RECEPTION SYSTEM

[75] Inventor: Takeshi Abe, Yokohama, Japan

[73] Assignee: Ricoh Co., Ltd., Tokyo, Japan

[21] Appl. No.: 831,793

[22] Filed: Sep. 9, 1977

[30] Foreign Application Priority Data

Sep. 18, 1976 [JP] Japan ............................ 51-112035

[51] Int. Cl.² .............................................. H04Q 5/00
[52] U.S. Cl. ..................................... 340/150; 340/203
[58] Field of Search ................. 340/150, 203; 328/25, 328/26, 30, 49

[56] References Cited

U.S. PATENT DOCUMENTS

| | | | |
|---|---|---|---|
| 3,144,566 | 8/1964 | Schindler | 328/30 X |
| 3,263,174 | 7/1966 | Bjorkman | 328/25 |
| 3,443,126 | 5/1969 | Meyer | 328/26 |
| 3,646,539 | 2/1972 | Becker | 340/203 |
| 3,982,199 | 9/1976 | Green | 328/49 |

Primary Examiner—Harold I. Pitts
Attorney, Agent, or Firm—Burgess, Ryan and Wayne

[57] ABSTRACT

A system wherein a train of a predetermined number of electrical pulses are generated whenever a predetermined quantity of electricity, gas or water is consumed. The pulses are transmitted to a remotely located data station or the like for remotely measuring the consumed quantity. The received pulse train is processed at a receiving site or the data station so as to derive a single pulse which in turn is counted by a counter.

3 Claims, 3 Drawing Figures

PULSE TRANSMISSION-RECEPTION SYSTEM

BACKGROUND OF THE INVENTION

The present invention relates to a pulse transmission reception system wherein a predetermined number of electrical pulses are generated every time a predetermined quantity of electricity, gas or water is consumed and transmitted to a remotely located receiver.

In systems of the type described, the quantity of electricity, gas or water consumed is generally represented by a number of rotations of a rotary shaft which in turn is stored in a coiled spring in an instantaneous transmission mechanism. When a predetermined quantity of electricity, gas or water is consumed, the energy stored in the coiled spring is released to drive a single pulse generator, and a pulse representative of each predetermined quantity of electricity, gas or water consumed is transmitted to and is counted by a remotely located counter. In general, the energy stored in the coiled spring is small in order to maintain a desired sensitivity of an electric, gas or water meter so that the power of the output pulse is low. Because of this low power output and since only one pulse is transmitted, the transmission of this pulse is disturbed by external noise very frequently so that mis-counting results.

SUMMARY OF THE INVENTION

Accordingly, one of the objects of the present invention is to provide a pulse transmission-reception system which is immune to external noise so that counting errors may be eliminated.

To this and other ends, the present invention provides a pulse transmission-reception system comprising a generator type pulse generating means for generating a predetermined number of pulses every time a predetermined quantity of electricity, gas or water is consumed, pulse discriminating means for selecting from the pulses transmitted from the pulse generating means positive pulses and negative pulses and inverting the negative pulses into positive pulses, logic means for processing the positive pulses from the pulse discriminating means so as to derive a single pulse representative of each predetermined consumed quantity, and a counter for counting the single pulses derived from the logic means.

DESCRIPTION OF THE PREFERRED EMBODIMENT

Figure 1:
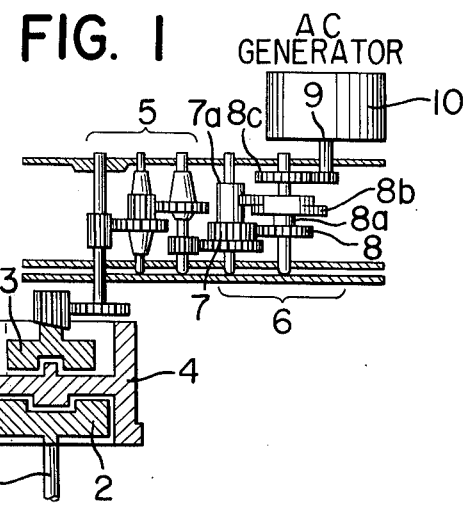
FIG. 1 is a side view, partly in section, of a pulse generating device used in the pulse transmission-reception system in accordance with the present invention.

In FIG. 1 there is shown a pulse generating device used in a pulse transmission-reception system in accordance with the present invention. Parts 1 through 9 are elements well known in the art, and a pulse generator 10 (in combination with the other elements) embodies the present invention. That is, a rotary shaft 1 rotates and the number of its rotations is proportional to the quantity of electricity, gas or city water consumed, and the rotation of the rotary shaft 1 is transmitted directly or through a reduction gear to a driving magnet 2 so that the number of rotations of the driving magnet 2 is proportional to the number of rotations of the rotary shaft 1. A driven magnet 3 is arranged in relationship opposed with the driving magnet 2 and is spaced apart therefrom by a shielding member 4. The rotation of the driven magnet 3 is transmitted through a reduction gear 5 to an instantaneous transmission mechanism generally indicated by the reference numeral 6. This mechanism 6 includes a gear 7 integrated with a cam 7a and a gear 8 loaded with a coiled spring 8a and encased in a barrel. Upon rotation of the gear 7, the gear 8 rotates; but a gear 8c remains stationary because the cam 7a is in engagement with a pawl 8b. As the gear 8 rotates, the coiled spring 8a is gradually wound up to store the energy for rotation. When the gear 7 rotates by a predetermined angle, for instance 180°, the cam 7a releases the pawl 8b so that the energy stored in the coiled spring 8a is immediately converted into the rotation of the gear 8c which is transmitted through a driving gear 9 to the pulse generator 10.

A prior art pulse generator generates a single pulse whenever the rotation of the gear 8c is transmitted thereto. When the pulse is transmitted to a remotely located counter, the possibility of picking up external noise has been very high so that mis-counting has occured very often. In order to prevent this problem, the amplitude of the pulse may be increased, but the torque for driving the pulse generator must be increased accordingly and consequently the sensitivity of an electric, gas or water meter is decreased.

The present invention was made to overcome this problem, and provides a pulse transmission-reception system wherein whenever the rotation of the instantaneous transmission mechanism 6 is transmitted to the pulse generator 10, and the latter generates a plurality of pulses which in turn are transmitted to a remotely located central station or the like in which the plurality of pulses transmitted are so processed as to derive a single pulse for metering.

Figure 3:
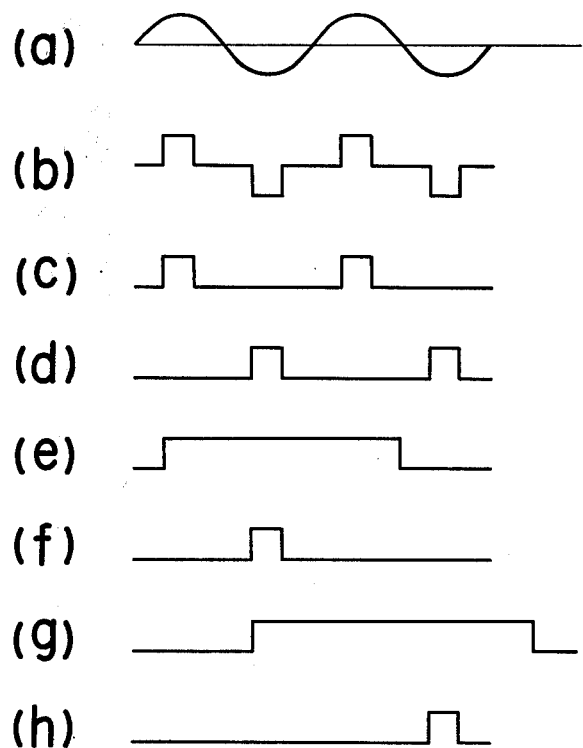
FIG. 3 shows waveforms of signals at various points in the circuit shown in FIG. 2.
Figure 2:
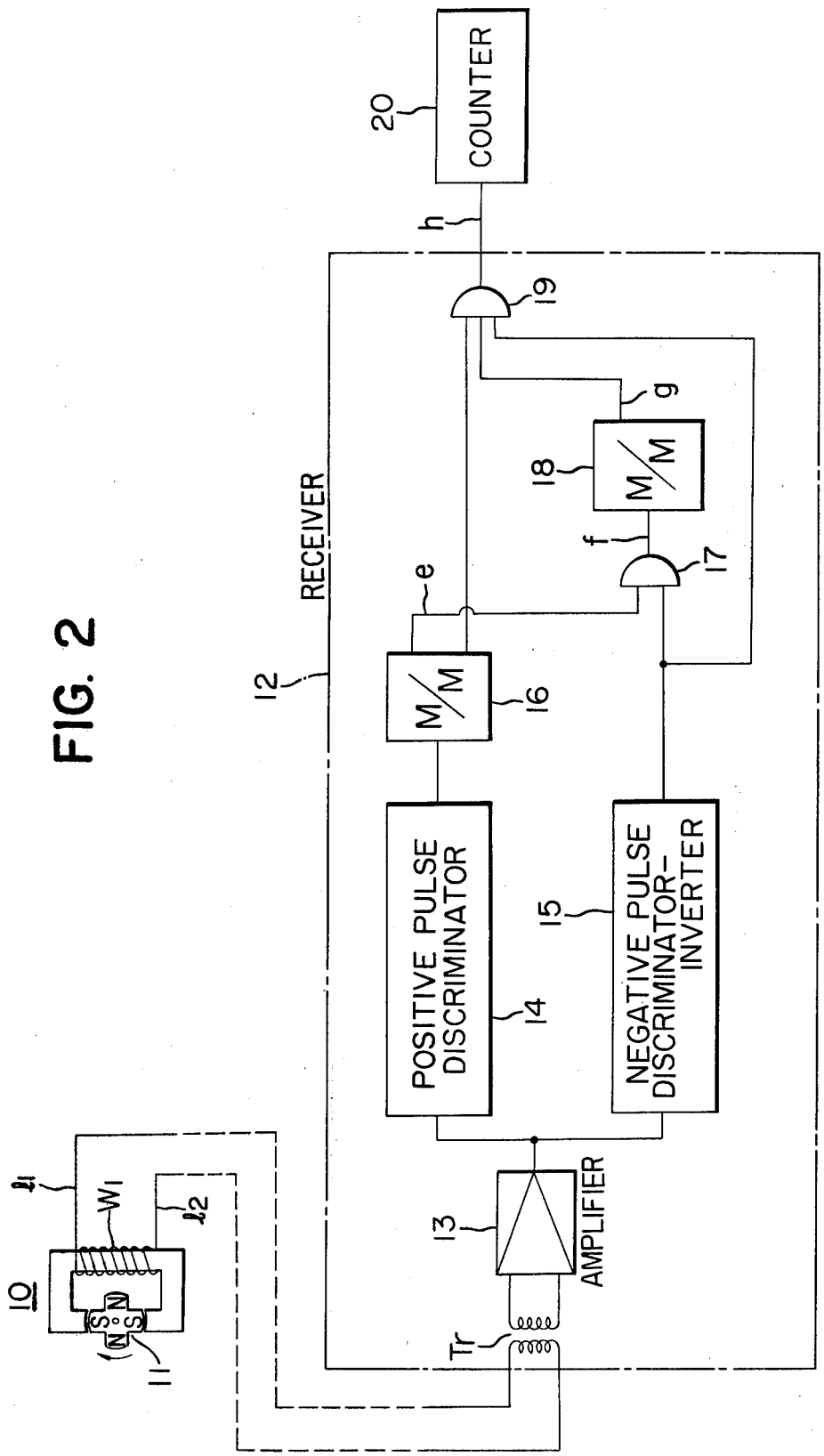
FIG. 2 is a circuit diagram of the pulse transmission-reception system.

In FIG. 2 there is shown one preferred embodiment of the pulse generator 10 in accordance with the present invention. The pulse generator 10 is an AC generator having a four-pole rotor 11 which rotates through 360° every time when the rotation of the instantaneous transmission mechanism 6 is transmitted to the pulse generator 10 so that an alternating signal is induced across an output winding $w_1$ as shown in FIG. 3(a). The alternating signal is transmitted through transmission lines $l_1$ and $l_2$ to a receiver 12 and is processed as will be described in detail with reference to FIGS. 2 and 3 so as to increment the contents of a counter 20.

In the receiver 12, the alternating signal [See FIG. 3(a)] is shaped by a transformer Tr and an amplifier 13 into a train of square pulses as shown in FIG. 3(b). These pulses (b) are applied to a positive pulse discriminator 14 and a negative pulse discriminator-inverter 15 so that positive pulses as shown in FIG. 3(c) are derived from the discriminator 14 while positive pulses as shown in FIG. 3(d) are derived from the discriminator-inverter 15. The pulses from the discriminator 14 are applied to a monostable multi-vibrator 16 so that a single rectangular pulse is derived as shown in FIG. 3(e) and applied to one input terminal of an AND gate 17. The pulses from the discriminator-inverter 15 are applied to the other input of the AND gate 17 so that an output pulse as shown in FIG. 3(f) is derived and applied to a second monostable multivibrator 18. A rectangular output pulse [See FIG. 3(g)] from the second monostable multivibrator 18 is applied to a first input terminal of a second AND gate 19, the output pulses from the discriminator-inverter 15, to a second input terminal; and the output pulse from the first monostable multivibrator 16 to a third input terminal. Therefore a single pulse is derived from the second AND gate 19 as shown in FIG. 3(h).

As described above, according to the present invention the pulses are generated in a predetermined mode or manner at a transmitting side, and are converted into a single pulse in this predetermined mode or manner at a receiving site so that external noise may be completely eliminated and consequently no erratic operation results. As described above, the torque for driving the pulse generator or AC generator must be low in order to increase the sensitivity of the electric, gas or water meter. As a result, the power of the output of the AC generator is low so that the output signal tends to pick up the external noise and consequently mis-counting occurs very often. However according to the present invention, the problem of mis-counting due to external noise may be substantially solved.

So far the present invention has been described in conjunction with the AC generator with the rotor having four poles so that four pulses may be generated by one rotation of the rotor, but it will be understood that the present invention is not limited to four poles and that the number of poles may be increased as required.

What is claimed is:

1. A pulse transmission-reception system characterized by the provision of
   (a) a generator type pulse generating and transmitting means for generating a predetermined number of pulses for every one rotation of a rotor of said pulse generating and transmitting means, said rotor being intermittently rotatable through an angle corresponding to the desired number of pulses to be generated,
   (b) pulse discriminating and selecting means for discriminating a desired number of pulses from a train of pulses transmitted from said pulse generating and transmitting means,
   (c) logic circuit means for processing a train of pulses from said pulses discriminating and selecting means so as to derive a single pulse,
   (d) counter means for counting said single pulse from said logic circuit means,
   (e) spring means coupled to said pulse generating means for storing energy for intermittent rotation of said rotor through said angle, and
   (f) trigger means for intermittently enabling said spring means to rotate said rotor.

2. A pulse transmission-reception system as set forth in claim 1, wherein said generator type pulse generating and transmitting means is an AC generator having a plural-pole rotor.

3. A pulse transmission-reception system, comprising:
   a generator type pulse generating and transmitting means for generating a predetermined number of pulses for every one rotation of a rotor of said pulse generating and transmitting means;
   pulse discriminating and selecting means for discriminating a desired number of pulses from a train of pulses transmitted from said pulse generating and transmitting means, said pulse discriminating and selecting means comprising positive pulse discriminating means and negative pulse discriminating and inverting means;
   logic circuit means for processing a train of pulses from said pulse discriminating and selecting means so as to derive a single pulse, said logic circuit means comprising:
      a first monostable multivibrator actuable in response to the output from said positive pulse discriminating means or said negative pulse discriminating and inverting means, a second monostable multivibrator actuable in response to the logical product of the output from said first monostable multivibrator and the output from said negative pulse discriminating and inverting means or said positive pulse discriminating means, and
      a three-inout AND gate for deriving the logical product from the stable output from said first monostable multivibrator, the astable output from said second monostable multivibrator and the output from said negative pulse discriminating and inverting means or from said positive pulse discriminating means; and
   counter means for counting said single pulse from said logic circuit means.

* * * * *

UNITED STATES PATENT OFFICE
CERTIFICATE OF CORRECTION

Patent No. 4,158,195            Dated June 12, 1979

Inventor(s) Takeshi Abe

It is certified that error appears in the above-identified patent and that said Letters Patent are hereby corrected as shown below:

Column 2, lines 24-25: "occured" should be --occurred--.

Column 4, line 38: "inout" should be --input--.

Signed and Sealed this

Eleventh Day of December 1979

[SEAL]

Attest:

SIDNEY A. DIAMOND

Attesting Officer     Commissioner of Patents and Trademarks